United States Patent
Sohn

(10) Patent No.: US 9,314,997 B2
(45) Date of Patent: Apr. 19, 2016

(54) PLATED STEEL SHEET HAVING PLATED LAYER WITH EXCELLENT STABILITY FOR HOT PRESS MOLDING

(75) Inventor: Il-Ryoung Sohn, Gwangyang-si (KR)

(73) Assignee: POSCO, Kyungsangbook-Do (KR)

( * ) Notice: Subject to any disclaimer, the term of this patent is extended or adjusted under 35 U.S.C. 154(b) by 0 days.

(21) Appl. No.: 14/127,350

(22) PCT Filed: Jun. 28, 2012

(86) PCT No.: PCT/KR2012/005130
§ 371 (c)(1),
(2), (4) Date: Dec. 18, 2013

(87) PCT Pub. No.: WO2013/002575
PCT Pub. Date: Jan. 3, 2013

(65) Prior Publication Data
US 2014/0120366 A1    May 1, 2014

(30) Foreign Application Priority Data

Jun. 28, 2011  (KR) .......................... 10-2011-0063303
Jun. 28, 2011  (KR) .......................... 10-2011-0063304

(51) Int. Cl.
| | |
|---|---|
| *B32B 15/04* | (2006.01) |
| *B32B 15/01* | (2006.01) |
| *C22C 18/00* | (2006.01) |
| *C22C 38/00* | (2006.01) |
| *C22C 38/04* | (2006.01) |

(Continued)

(52) U.S. Cl.
CPC .............. *B32B 15/043* (2013.01); *B32B 15/012* (2013.01); *B32B 15/013* (2013.01); *B32B 15/015* (2013.01); *B32B 15/017* (2013.01); *C22C 18/00* (2013.01); *C22C 38/002* (2013.01); *C22C 38/04* (2013.01); *C23C 2/02* (2013.01); *C23C 2/06* (2013.01); *C23C 2/26* (2013.01); *C23C 2/28* (2013.01); *C23C 10/28* (2013.01); *C23C 28/321* (2013.01); *C23C 28/3225* (2013.01); *C23C 28/345* (2013.01); *Y10T 428/12757* (2015.01)

(58) Field of Classification Search
None
See application file for complete search history.

(56) References Cited

U.S. PATENT DOCUMENTS

| | | |
|---|---|---|
| 5,447,802 A | 9/1995 | Tobiyama et al. |
| 6,296,805 B1 | 10/2001 | Laurent et al. |

(Continued)

FOREIGN PATENT DOCUMENTS

| | | |
|---|---|---|
| CN | 101146923 A | 3/2008 |
| CN | 101323941 A | 12/2008 |

(Continued)

OTHER PUBLICATIONS

English translation of Takahashi et al., JP2007-056307 dated Sep. 30, 2014.*

(Continued)

*Primary Examiner* — Adam Krupicka
(74) *Attorney, Agent, or Firm* — Finnegan Henderson Farabow Garrett & Dunner LLP

(57) ABSTRACT

The present invention relates to a plated steel sheet having a plated layer with excellent stability for hot press molding, and more specifically, to a plated steel sheet having a plated layer with excellent stability for hot press molding in which a LME (Liquid Metal Embrittlement) phenomenon caused by a zinc enrichment region included in the plated layer is suppressed during hot press molding.

13 Claims, 9 Drawing Sheets

(51) Int. Cl.
*C23C 2/06* (2006.01)
*C23C 2/02* (2006.01)
*C23C 2/26* (2006.01)
*C23C 2/28* (2006.01)
*C23C 10/28* (2006.01)
*C23C 28/00* (2006.01)

(56) References Cited

U.S. PATENT DOCUMENTS

| | | |
|---|---|---|
| 2002/0092586 A1 | 7/2002 | Weir |
| 2002/0160221 A1 | 10/2002 | Takeda et al. |
| 2006/0121305 A1 | 6/2006 | Yoshikawa et al. |
| 2008/0271823 A1 | 11/2008 | Hofmann et al. |

FOREIGN PATENT DOCUMENTS

| | | |
|---|---|---|
| EP | 2520686 A2 | 11/2012 |
| JP | 58-120772 | 7/1983 |
| JP | 06-088187 | 3/1994 |
| JP | 10-226862 | 8/1998 |
| JP | 11-350164 A | 12/1999 |
| JP | 2002-180224 | 6/2002 |
| JP | 2004-124207 | 4/2004 |
| JP | 2004-323897 | 11/2004 |
| JP | 2005-074464 | 3/2005 |
| JP | 2005-113233 | 4/2005 |
| JP | 2007-056307 | 3/2007 |
| KR | 10-1995-0027003 A | 10/1995 |

OTHER PUBLICATIONS

Chen et al., Short Term Formation of the Inhibition Layer During Continuous Hot-Dip Galvanizing, Galvatech 2007, 6 pages.
Alibeigi et al., Fe—Al Interfacial Layer Formation Kinetics During the Continuous Galvanizing of Mn-Containing Steels, Materials Science and Technology (MS&T) 2012, Oct. 7-11, 2012, 8 pages.
Extended European Search Report dated Feb. 10, 2015 in corresponding European Application No. 12804542.4.
Communication pursuant to Rule 114(2) EPC (Notification of Observation of Third Party) dated Mar. 10, 2015 in corresponding European Application No. 12804542.4.
Chinese Office Action dated Mar. 6, 2015 in corresponding Chinese Application No. 201280039619.2.

* cited by examiner

PLATED STEEL SHEET HAVING PLATED LAYER WITH EXCELLENT STABILITY FOR HOT PRESS MOLDING

TECHNICAL FIELD

The present disclosure relates to a plated steel sheet for hot press forming having a stable plating layer, and more particularly, to a plated steel sheet for hot press forming, the plated steel sheet having a stable plating layer so that liquid metal embrittlement (LME) is not caused by a zinc (Zn)-rich region of the plating layer in a hot press forming process.

BACKGROUND ART

Recently, demand for high-strength steel sheets for improving vehicle fuel economy to meet with environmental protection regulations has rapidly increased. In accordance with the strengthening of automotive steel sheets, wear and fracturing may occur therein during press forming, and thus it may be difficult to form products having complex shapes. Therefore, in order to resolve such limitations, the production of products through a hot pressing process in which steel sheets are pressed in a heated state has been markedly increased.

Steel sheets for hot pressing are generally subjected to hot press forming in a temperature range of 850° C. to 930° C., and thus are likely to be oxidized and coated with oxide scale during heating. Therefore, an additional process such as shot blasting may be necessary to remove such scale after product formation, and thus, corrosion resistance of such products may be inferior to that of plated materials.

Therefore, in methods proposed to address such limitations, such as that disclosed in U.S. Pat. No. 6,296,805, a steel sheet is plated with an aluminum (Al)-containing material resistant to the heating furnace environment so as to suppress surface oxidation of the steel sheet and increase the corrosion resistance of the steel sheet by the formation of a passive Al film. Products using such methods have been developed and commercialized.

However, although such Al-plated materials have good heat resistance at high temperatures, corrosion resistance thereof is inferior to that of materials plated with zinc (Zn) through a sacrificial anode method, and manufacturing costs may also increase.

On the other hand, high-temperature heat resistance of zinc (Zn) is significantly inferior to that of Al. Therefore, at a high temperature of 850° C. to 930° C., a steel sheet plated with Zn by a typical plating method is subjected to alloying of Zn and oxidation, which make the zinc plating layer unstable and reduce the Zn content of the zinc plating layer to less than 20%. Therefore, the zinc plated steel sheet is deteriorated in terms of corrosion resistance.

In addition, if the zinc plated steel sheet is heated and hot-pressed, an alloy phase of the zinc plating layer having a high Zn content may become liquid and make contact with the steel sheet, rendering the surface of the steel sheet brittle (through liquid metal embrittlement, LME) and thus causing damage such as cracking.

DISCLOSURE

Technical Problem

An aspect of the present disclosure may provide a plated steel sheet for hot press forming, the plated steel sheet having a zinc plating layer showing improved alloying characteristics and high-temperature stability for preventing a liquid metal embrittlement (LME) phenomenon.

Technical Solution

According to an aspect of the present disclosure, a plated steel sheet for hot press forming, includes: a base steel sheet; an aluminum (Al)-rich layer formed above the base steel sheet and including 30% or more of Al; and a zinc plating layer formed on the Al-rich layer, wherein grains of the Al-rich layer include fifteen or fewer grains having a grain size of 500 nm or greater per 100 m$^2$ on average, and an area percentage of the Al-rich layer between the base steel sheet and the zinc plating layer is 88% or greater.

Advantageous Effects

According to the embodiments of the present disclosure, in the plated steel sheet for hot press forming, the grain size of a surface compound layer (for example, an aluminum (Al)-rich layer) is adjusted to be uniformly small so that the entire plating layer may be uniformly alloyed during heating in a hot press forming process. Therefore, a zinc (Zn)-rich region (having a high Zn content of 40 wt % or more) may not easily be formed, to prevent steel sheet damage caused by liquid metal embrittlement (LME) in a hot press forming process.

In addition, since aluminum (Al) included in the compound layer easily decomposes and moves to a surface layer to form an oxide layer during heating, volatilization of Zn included in the plating layer and oxide growth may be prevented, and thus the content of Zn in the plating layer may be properly controlled to guarantee the corrosion resistance of a press formed part.

BEST MODE

Figure 1:
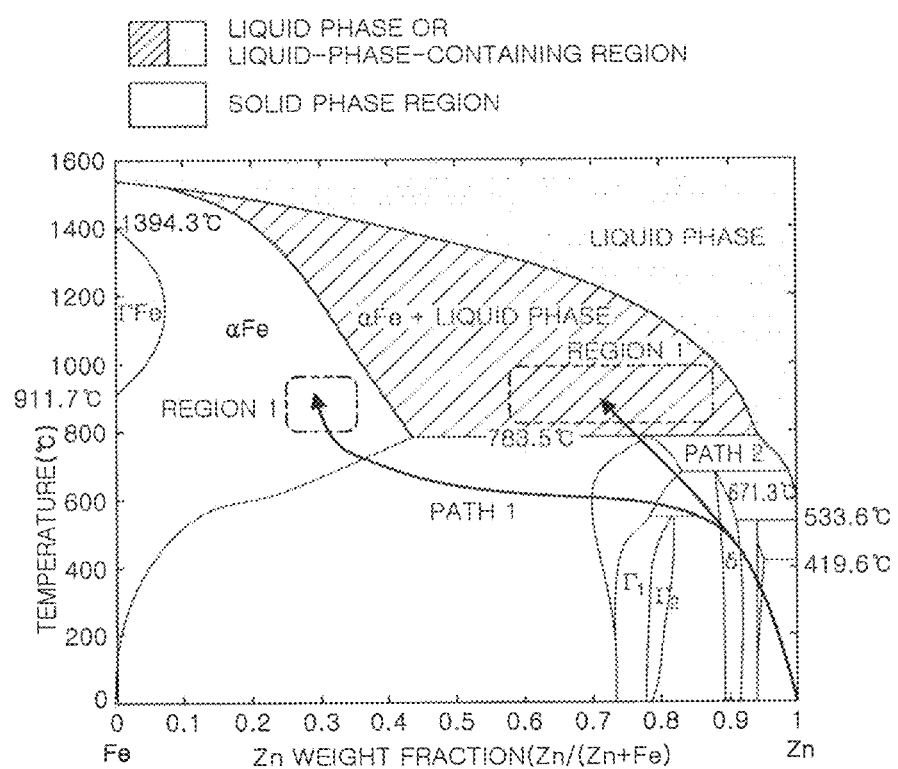
FIG. 1 is a phase diagram showing phase separation into Fe-rich and Zn-rich regions when a zinc plated steel sheet is heated to a hot press forming temperature in the related art.

Hereinafter, a steel sheet will be described in detail according to embodiments of the present disclosure.

The present disclosure relates to a zinc plated steel sheet. In general, a zinc plated steel sheet may have a plating layer in which Zn is included as a main ingredient (for example, Zn≥50 wt %), and which demonstrates improved corrosion resistance owing to the sacrificial anode effect of Zn.

The inventors found that if an aluminum (Al)-rich layer containing 30 wt % or more of Al is formed between a steel sheet and a plating layer in a zinc plated steel sheet (particularly, when the Al-rich layer is uniformly formed), volatilization of Zn from the plating layer and oxidation of the plating layer are suppressed to allow for the formation of a uniform alloy layer, and invented the plated steel sheet of the present disclosure. That is, the plated steel sheet of the present disclosure includes: a base steel sheet; an Al-rich layer formed on the base steel sheet and having 30 wt % or more of Al; and a zinc plating layer formed on the Al-rich layer.

When the plated steel sheet is heated in a hot pressing process, the Al-rich layer is diffused to the surface of the plating layer and is selectively oxidized to form a thin, dense oxide layer containing $Al_2O_3$ as an main ingredient (for example, 90 wt % or more of $Al_2O_3$). In the hot press forming process, the oxide layer formed on the plating layer prevents volatilization of Zn such that during alloying caused by heating, Zn may be sufficiently included in an alloy layer to lead to a sufficient sacrificial anode effect. Furthermore, in the heating stage of the hot pressing process, since the Al-rich layer decomposes uniformly, alloying proceeds rapidly and uniformly, and thus a liquid metal embrittlement phenomenon caused by a local liquid phase existing in a plating layer having a non-uniform Zn content may be effectively suppressed. The Al-rich layer may exist as a compound of iron (Fe) and a metal having a stoichiometric composition ratio. For example, the Al-rich layer may exist as $Fe_2Al_5$.

The Al-rich layer may include a smaller amount of Zn. However, the Zn content of the Al-rich layer may be limited to 10 wt % or less. If the Zn content is 10 wt % or greater, the Al-rich layer may have a non-uniform shape to lower the effect of uniform alloying.

Fine grains may be continuously formed in the Al-rich layer, and in the present disclosure, an area percentage of the Al-rich layer between the steel sheet and the plating layer may be 88% or greater, for example, 95% or greater. If the area percentage of the Al-rich layer is low, alloying may occur non-uniformly, resulting in a liquid metal embrittlement phenomenon during a hot pressing process, and an oxide layer may be insufficiently formed on the plating layer to result in difficulty in suppressing volatilization of Zn.

In addition, grains of the Al-rich layer may include a large number of grains having a grain size of 500 nm or less (although there are many grain size definitions, the grain size in the present disclosure is defined as the average diameter of grains). The reason that the percentage of fine grains having a grain size of 500 nm or less is high is as follows: when the Al-rich layer is heated in a press forming process, fine grains may easily decompose and move rapidly to the surface of the plating layer to form an oxide layer, thus leading to rapid and uniform alloying of Fe. That is, as the number of fine grains increases, the interfacial area increases to make compound particles unstable and thus to lead to easy decomposition.

For this reason, for example, when the Al-rich layer is observed using a grain size analyzer such as an image analyzer, the number of grains having a grain size of 500 nm or greater per 100 $\mu m^2$ may be fifteen or fewer on average. If the number of grains having a grain size of 500 nm or greater is greater than fifteen, the overall granularity may not be uniform, and the above-described decomposition of the Al-rich layer may not occur easily. In this case, volatilization of Zn and liquid metal embrittlement may be less effectively prevented.

Therefore, according to an aspect of the present disclosure, the plated steel sheet may include: a base steel sheet; an Al-rich layer formed above the base steel sheet and including 30% or more of Al; and a zinc plating layer formed on the Al-rich layer. Gains of the Al-rich layer may include fifteen or fewer grains having a grain size of 500 nm or greater per 100 $\mu m^2$ on average, and the area percentage of the Al-rich layer between the base steel sheet and the zinc plating layer may be 88% or greater, for example, 95% or greater.

The Al-rich layer formed on a surface of the base steel sheet may be analyzed as follows. Since the Al-rich layer is formed between the base steel sheet and the zinc plating layer, it may be difficult to measure the area percentage of the Al-rich layer if the zinc plating layer is not removed. That is, although layer distribution may be observed from a cross section, it is difficult to observe grain size distribution from a cross section. Therefore, to check grain size distribution, the zinc plating layer is chemically removed without damaging the Al-rich layer formed on the surface of the base steel sheet, and then the Al-rich layer is analyzed. For example, the zinc plating layer is dissolved using a $HNO_3+CrO_3+ZnSO_4$ solution until only the Al-rich layer remains. An image of the remaining Al-rich layer is taken using a scanning electron microscope (SEM) at a magnification of 20,000 times to 50,000 times and is analyzed to measure the area percentage and grain size of the Al-rich layer. The number of grains having a grain size of 500 nm or greater per 100 $\mu m^2$ may be measured by many methods. For example, a reliable value may obtained by measuring the number of grains having a grain size of 500 nm or greater per 5,000 $\mu m^2$ to 10,000 $\mu m^2$, and then calculating the average number per 100 $\mu m^2$. In this case, if it is difficult to measure grain sizes from a single large region, grain sizes may be repeatedly measured from smaller regions, and then the areas of the smaller regions and the number of grains having a grain size of 500 $\mu m$ may be added up, respectively.

In addition, the area percentage of the Al-rich layer is measured from the SEM image taken at a magnification of 20,000 times to 50,000 times, based on ASTM E 562-08, Standard Test Method for Determining Volume Fraction by Systematic Manual Point Count. In addition, grain boundaries presented on a plane when the SEM image is observed using an image analysis method is image-processed to measure the grain size of the Al-rich layer. For example, in the present disclosure, grain sizes are measured using an image analyzer, LEICA Q 550 (by LEICA).

The grain size distribution of the Al-rich layer may be adjusted through various methods. In the independent claim of the present disclosure, the method of adjusting the grain size distribution of the Al-rich layer is not limited to a particular method. In an exemplary method, a diffusion prevention layer may be formed, or a dew-point temperature may be controlled in an annealing process to result in internal oxidation of elements dissolved in the steel sheet and thus to prevent oxidation of the elements from reaching the surface of the steel sheet. In this manner, the above-described grain size distribution may be easily obtained. For this, the average thickness of an oxide formed on the surface of the steel sheet in an annealing process may be regulated to be 150 nm or less.

At this time, the thickness of the Al-rich layer may be 0.1 pun to 1.0 μm. When the thickness of the Al-rich layer is less than 0.1 μm, the amount thereof is too small to continuously form an oxide film, and when the thickness is greater than 1.0 μm, an excessively thick oxide film may be formed. Therefore, the thickness of the Al-rich layer may be limited to a range of 0.1 μm to 1.0 μm.

In addition, the inventors found that when alloying occurs through appropriate path according to heating paths, a liquid phase region causing a liquid metal embrittlement phenomenon is not present in the zinc plated steel sheet in a heating stage of a hot press forming process, and the corrosion resistance of the zinc plated steel sheet is not lowered, because alloying and volatilization of Zn causing an insufficient Zn content in the zinc plating layer do not occur excessively.

Figure 10:
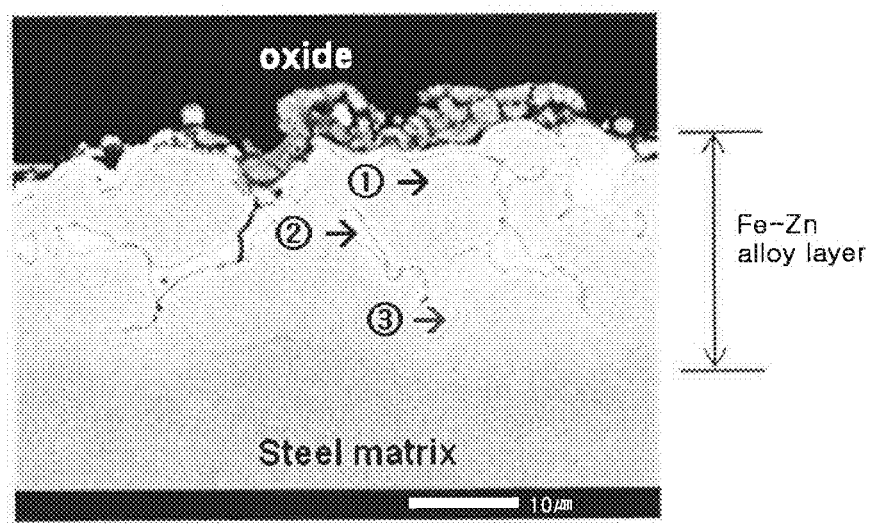
FIG. 10 shows EDS analysis results on a cross section and ingredients of a hot press formed part with respect to positions in Comparative Example 1.

That is, it may be necessary for the zinc plating layer to have a uniform alloy composition in a hot press forming temperature range of 780° C. to 950° C. In other words, although the amounts of Fe and Zn existing in the entirety of the plating layer are not changed, alloying may occur non-uniformly according to alloying paths, and thus a Zn-rich region (area 2) may be included in an Fe-rich region (area 1) as shown in FIG. 10. In this case, the Zn-rich regions (area 2) may include a solid phase alloy region having a Zn fraction of about 0.4 (40 wt %) and a liquid phase alloy region having a Zn fraction of 0.9 (90 wt %). That is, the entire zinc plating layer may be divided into three regions: an Fe-rich region, a solid phase alloy region of a Zn-rich region, and a liquid phase alloy region of the Zn-rich region.

In a hot pressing process, liquid phase metal existing in the Zn-rich region makes contact with the base steel sheet and permeates into crystal grain boundaries of the base steel sheet, which may be relatively vulnerable to high temperatures, to make the grain boundaries brittle. That is, a liquid metal embrittlement phenomenon is caused.

However, according to the present disclosure, a liquid phase region does not exist in the plating layer of the plated steel sheet in a hot press forming temperature range.

According to research undertaken by the inventors, when the Zn content of the zinc plating layer is substantially within a range of 35 wt % or less throughout the entirety of the zinc plating layer at a hot press forming temperature of 900° C., the above-described effect may be obtained. That is, as described above, if the Zn content in the zinc plating layer is excessively high, a liquid phase region may be present. If the Zn content is within the range at the temperature, that is, if Fe alloying occurs sufficiently, embrittlement by a liquid phase metal (liquid metal embrittlement, LME) may be prevented in a typical hot press forming temperature range of 780° C. to 950° C. Therefore, the above-mentioned range of the Zn content is selected as a reference at the temperature range.

However, if the Zn content of the zinc plating layer is excessively reduced, that is, if alloying occurs excessively, the corrosion resistance of a hot-pressed part may be significantly lowered, while the possibility of LME may also be lowered. That is, as described above, since oxidation of zinc plated steel sheets is prevented by a sacrificial anode method, zinc plated steel sheets are more resistant to corrosion as compared with aluminum plated materials or non-plated materials, and thus are suitable for press forming. Thus, if Fe alloying occurs excessively in the zinc plating layer, the Zn content of the zinc plating layer may be lowered, and the activity of Zn is significantly lowered because of interaction between Fe and Zn. If the activity of Zn reduces, oxidation of Zn is not active, and thus Zn may not sufficiently act as a sacrificial anode.

Therefore, it may be necessary to avoid excessive alloying. According to research undertaken by the inventors, when the Zn content in an alloy layer is 25% or greater at 900° C., Zn included in the alloy layer acts a sacrificial anode.

Therefore, according to an aspect of the present disclosure, when the plated steel sheet for hot press forming is heated to 900° C., the Zn content in the plating layer is within the range of 25 wt % to 35 wt % substantially throughout all positions of the plating layer. In the present disclosure, the expression "throughout all the positions" is used to denote that when the ingredients of the plating layer subjected to alloying are analyzed (when the ingredients of the plating layer are analyzed after the plating layer is alloyed in a 900° C. heated state and rapidly cooled to room temperature), a portion of the plating layer having the above-mentioned alloy composition is 90% or greater in volume, for example, 95% or greater.

The above-mentioned alloy composition may be analyzed in volume ratio by polishing a cross section of a hot-pressed sample by a mirror polishing method, slightly etching the cross section with a Nital solution, and observing the cross section with an optical microscope or SEM. In this case, a region having a Zn content in the range of 25% to 35% and the other region are physically clearly distinguished, and an image of a plating layer may be analyzed using an image analyzer having an image analysis function.

The degree of alloying may be different according to heating process conditions and a heating time period. Thus, in the present disclosure, a plating layer of a sample is analyzed based on a typical hot press forming process after heating the sample from room temperature to a measurement temperature (900° C.) at a rate of 2° C./sec to 20° C./sec, maintaining the sample at the measurement temperature (900° C.) for 0 to 6 minutes, and cooling the sample.

As shown in the Fe—Zn phase diagram of FIG. 1, the zinc plating layer has many intermediate phases, and thus as alloying proceeds with increasing temperature, the zinc plating layer inevitably has two phase regions under typical heating conditions. For example, the typical heating conditions may be heating conditions for hot press forming: internal temperature of a heating furnace=780° C. to 950° C., and average heating rate=2° C./sec to 20° C./sec.

Figure 3:
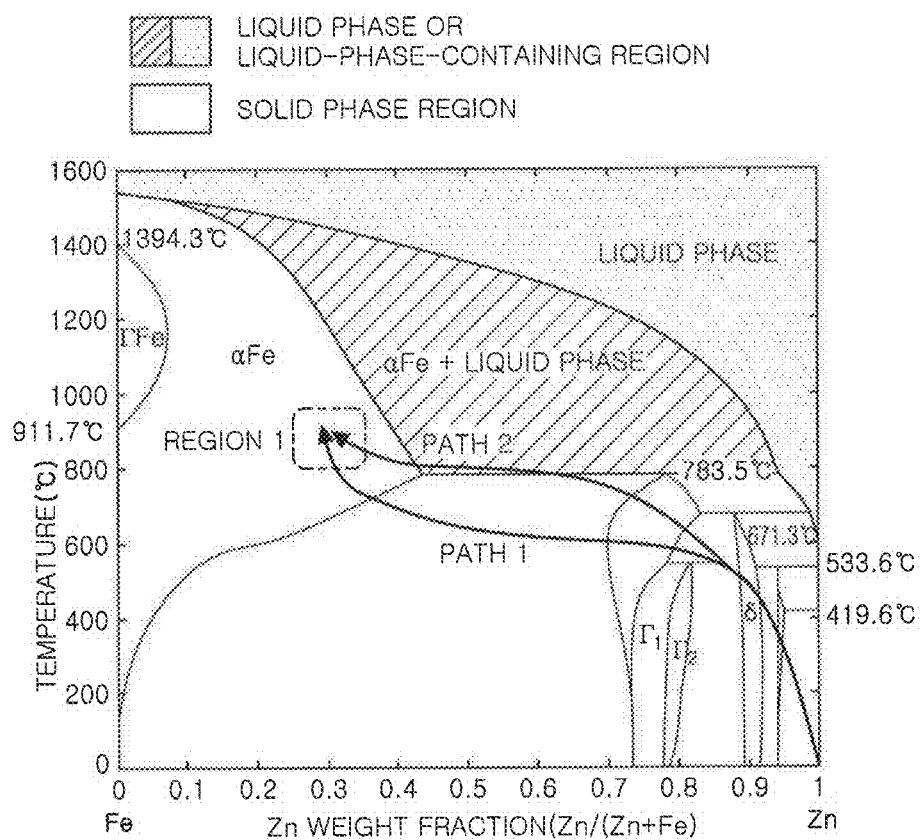
FIG. 3 is a phase diagram showing heating paths of a steel sheet for hot press forming according to an embodiment of the present disclosure.

At this time, each phase region may have a proper composition so that a final alloy layer can have a desired composition at a hot press forming temperature. As shown in FIG. 3, if two regions appear at a relatively low temperature in an early stage of alloying, it is difficult for the compositions of the two regions to converge to the same composition range, and eventually two regions are present at a hot press forming temperature. Thus, a liquid metal exists in a plating layer to cause LME.

According to research undertaken by the inventors, such phase separation occurs due to rapid alloying, and if conditions of a steel sheet are adjusted to lead to uniform and rapid alloying, the compositions of an alloy layer may converge to a single region at a hot press forming temperature. Uniform and gradual alloying may be confirmed from the phase structure at 750° C. That is, at the temperature, the zinc plating layer is divided into a Fe-rich region having a Zn content of 40 wt % or less, for example, 30 wt % to 40 wt %; and a Zn-rich region having a Zn content of greater than 40 wt %, for example, 60 wt % to 90 wt %. If the Fe-rich region has a too low Zn content, the Zn content of an alloy layer may also be too low at a hot press forming temperature, resulting in a low degree of corrosion resistance and non-uniformity in the alloy layer. If the Fe-rich layer has a too high Zn content, it is difficult for the compositions of the two regions to converge to a single composition range at a hot press forming temperature, and thus many liquid phase regions may be present to result in LME. For example, the Zn content of the Zn-rich region may range from 60 wt % to 90 wt %. This may be because a portion of the phase of the plating layer decomposes into a δ-phase or a Γ-phase.

Therefore, according to an exemplary aspect of the present disclosure, at 750° C., the plated steel sheet for hot press forming may include an Fe-rich region having a Zn content of 40 wt % or less, and a Zn-rich region having a Zn content of greater than 40 wt %. However, the degree of alloying may be varied according to heating process conditions and a heating time period. Thus, in the present disclosure, the properties of an alloy layer are based on a typical hot press forming process. That is, the alloy layer has the above-described properties after being heated from room temperature to a measurement temperature (750° C.) at a rate of 2° C./sec to 20° C./sec, maintained at the measurement temperature (750° C.) for 0 to 6 minutes, and being cooled. In the present disclosure, the plated steel sheet for hot press forming, satisfying the above-mentioned conditions, has an alloy layer formation history as shown in the phase diagram of FIG. 3.

In addition, according to an exemplary aspect of the present invention, the base steel sheet may include a surface diffusion layer of a metal (hereinafter, simply referred to as a surface diffusion layer) to a depth of 1 µm or less from the surface of the base steel sheet. In the surface diffusion layer, a reduced amount of Gibbs free energy per mole of oxygen is smaller than that of chromium (Cr). The surface diffusion layer is dissolved in an Fe—Zn phase when the plated steel sheet is heated in a hot press forming process. Therefore, ingredients dissolved in the base steel sheet may be prevented from excessively diffusing into the Zn plating layer, and Zn of the zinc plating layer may be prevented from excessively diffusing into the base steel sheet. Although Zn of the zinc plating layer excessively diffuses into the base steel sheet, the content of the Zn diffused into the base steel sheet is low, as compared with the other ingredients of the base steel sheet, and the Zn diffused into the base steel sheet substantially does not improve the corrosion resistance of the base steel sheet. Therefore, a large amount of Zn (for example, 25 wt % to 35 wt %) may be ensured by reducing the amount of Zn consumed as described above, so as to improve the corrosion resistance of the plated steel sheet.

In addition, the surface diffusion layer facilitates uniform diffusion of Fe from the base steel sheet for alloying, and thus a liquid phase metal may not be present in the plating layer at a hot press forming temperature (for example, 780° C. to 950° C.), thereby effectively preventing LME. Furthermore, in the present disclosure, since the surface diffusion layer facilitates formation of the Al-rich layer, grains of the Al-rich layer may be simultaneously formed, and the Al-rich layer may have a grain size distribution satisfying conditions of the present disclosure.

For this, the surface diffusion layer includes 0.1 wt % or more of the metal releasing a smaller amount of Gibbs free energy than Cr per mole of oxygen during an oxidation reaction. The metal is diffused into the base steel sheet in an annealing process after coating and thus the content thereof in the surface of the base steel sheet is reduced. According to results of research, when the content of the metal to a depth of 1 µm or less from the surface is 0.1 wt % or more, the surface of the surface diffusion layer may be enriched with a greater amount of Al by allowing Al in a plating bath to react with the metal during a zinc plating process. In addition, the content of the metal may be limited to 30% or less. If the content of the metal is greater than 30%, initial alloying may be excessively fast, and thus the alloying uniformity of a plating layer may be deteriorated. That is, the metal, in which a reduced amount of Gibbs free energy per mole of oxygen during an oxidation reaction is smaller than that of Cr, may be included in an amount of 0.1 wt % or more to a depth of 1 µm or less from the surface of the base steel sheet, in order to secure the heat resistance of the zinc plating layer by a metal coating preventing decomposition of the zinc plating layer at a high temperature. When the metal is included in an amount of 1.0 wt % or more, deterioration of the zinc plating layer may be effectively prevented, and for example, when the content of the metal is 3.0 wt % or more, the zinc plating layer may have a higher degree of heat resistance.

In addition, when the metal releasing a smaller amount of Gibbs free energy than Cr per mole of oxygen during an oxidation reaction is included in the surface diffusion layer or the zinc plating layer, the metal may also be included in the Al-rich layer in an amount of 5 wt % or less, for example, 0.1 wt % to 5 wt %, for the total weight of the Al-rich layer. The metal releasing a smaller amount of Gibbs free energy than Cr per mole of oxygen during an oxidation reaction may be originated from the base steel sheet.

In particular, since the surface diffusion layer is formed, more Al may be concentrated on the surface diffusion layer by an interfacial reaction, and thus the surface diffusion layer may significantly affect the formation of the Al-rich layer. At this time, an area between the Al-rich layer and the surface diffusion layer, in which portions having 5 wt % or more of the metal releasing a smaller amount of Gibbs free energy than Cr per mole of oxygen during an oxidation reaction are overlapped in electron probe microanalyzer (EPMA) analysis, may be 10% or less of the total area between the total surface diffusion layer and Al-rich layer. The overlapping portions denote that the metal and Al generate an alloy reaction to form an alloy phase. If Al is alloyed with the metal as described above, Al is not easily diffused into the plating layer during press heating. Thus, as the amount of Al existing in an alloyed state is increased, the amount of Al able to contribute to the formation of a continuous $Al_2O_3$ oxide film is substantially decreased. Therefore, when the area of the overlapping portions is 10% or less in EPMA analysis, Al existing in a non-alloyed state is sufficiently included in the Al-rich layer to lead to effective formation of an $Al_2O_3$ oxide film.

A typical example of the metal releasing a smaller amount of Gibbs free energy than Cr per mole of oxygen during an oxidation reaction may be nickel (Ni), and other examples thereof may include Fe, cobalt (Co), copper (Cu), tin (Sn), and antimony (Sb). Ni is an element having an oxygen affinity lower than that of Fe, and when a Ni surface diffusion layer is coated on the steel sheet, the Ni surface diffusion layer is not oxidized during an annealing process after coating and acts to prevent oxidation of oxidative elements such as Mn and Si on the surface of the steel sheet. The foregoing Fe, Co, Cu, Sn, and Sb also show similar characteristics when coated on a metal surface. At this time, Fe may be used in a state alloyed with Ni, instead of being used alone. In addition, the metal releasing a smaller amount of Gibbs free energy than Cr per mole of oxygen during an oxidation reaction may exist in the surface diffusion layer. However, the metal is not limited thereto. For example, in a plating bath, the metal and Zn may be used together to form a zinc plating layer in which the metal is included.

In addition, the zinc plating layer is not limited to a particular type. Examples of the zinc plating layer include zinc plating layers formed by hot-dip plating, electroplating, dry plasma plating, and high-temperature and liquid-phase Zn spraying.

Fe may be added to the zinc plating layer. If Fe is sufficiently diffused into the zinc plating layer, a Fe—Zn alloy phase having a high melting point is formed, and thus the heat resistance of the zinc plating layer is increased. Fe is usually included in the zinc plating layer as Zn diffused into the base steel sheet during a plating process, and as the content of Fe increases, the zinc plating layer enters a brittle delta or gamma phase. Therefore, the content of Fe in the zinc plating layer may have an upper limit, for example, 15.0 wt % in the present disclosure. For example, when the content of Fe is 5.0 wt % or less, micro-cracks may be markedly reduced, which may be generated in the zinc plating layer.

The zinc plating layer may include: 15.0 wt % or less of Fe, 2.0 wt % or less of the metal releasing a smaller amount of Gibbs free energy than Cr per mole of oxygen during an oxidation reaction, and the balance of Zn and inevitable impurities. The metal releasing a smaller amount of Gibbs free energy than Cr per mole of oxygen during an oxidation reaction and included in the hot-dip zinc plating layer is diffused into the plating layer during heating in a hot pressing process. In particular, the metal releasing a smaller amount of Gibbs free energy than Cr for one mole of oxygen during an oxidation reaction is dissolved in Fe—Zn during heating in the hot pressing process to form a ternary phase and thus, diffusion of Fe from the base steel sheet into the plating layer during heating in the heat pressing process is reduced. As a result, the metal plays a key role in forming the zinc plating layer as a single plating layer without decomposition. Therefore, 0.01 wt % or more of the metal releasing a smaller amount of Gibbs free energy than Cr per mole of oxygen during an oxidation reaction may be included in the plating layer and the Al-rich layer when the plating layer and the Al-rich layer are oxidized, so as to give heat resistance to the plating layer against press heating and guarantee sufficient formation of a ternary phase. In terms of economical aspects, 2.0 wt % of the metal may be included.

In the present disclosure, Al of the Al-rich layer may be supplied in various manners. For example, when Al is supplied from the plating layer, the plating layer may include 0.05 wt % to 0.5 wt % of Al. When the content of Al is less than 0.05%, the plating layer may be non-uniformly formed, and when the content of Al is greater than 0.5%, a thick inhibition layer is formed on an interface of the zinc plating layer to decrease diffusion rates of Fe and Mn into a Zn layer at an initial period of a reaction in a hot press heating furnace and thus, alloying in the heating furnace may be delayed. Therefore, the content of Al may be limited to 0.5% or less and for example, if the content of Al is 0.25% or less, it may be more effective in preventing the delay of alloying.

When the thickness of the zinc plating layer is 3 μm or more, heat resistance properties at high temperatures may be secured. If the thickness is less than 3 μm, the zinc plating layer may have a non-uniform thickness or a lower degree of corrosion resistance. For example, it may be effective for the zinc plating layer to have a thickness of 5 μm or more. Also, corrosion resistance may be secured as the plating layer is thicker, but sufficient corrosion resistance may be obtained when the thickness of the plating layer is about 30 μm. An upper limit of the thickness of the zinc plating layer may be determined as 30 μm in terms of economic factors and for example, the thickness of the plating layer may be controlled to be 15 μm or less to secure a high ratio of an alloy phase having a Fe content of 60 wt % or more in the plating layer after hot-pressing, and thus, it may be possible to prevent cracks able to be generated on a surface due to LME during press forming.

In addition, an annealing process may be performed according to the type of the plated steel sheet, and in this case, an annealing oxide may be formed on the plated steel sheet. The annealing oxide may be non-uniformly distributed on the surface diffusion layer and some of the annealing oxide may be included in the Al-rich layer. The annealing oxide functions as a barrier that prevents alloying of elements such as Fe and Mn included in the hot-dip zinc plating layer and may have a negative effect on forming the above-described grain distribution of the Al-rich layer in the present disclosure. Therefore, the annealing layer may be regulated to be as thin as possible, or not to be formed. In the present disclosure, the thickness of the annealing oxide is controlled to be 150 nm or less, so as to facilitate the alloying to the hot-dip zinc plating layer and thus to improve heat resistance and adhesion characteristics thereof after press forming.

If the thickness of the annealing oxide is greater than 150 nm, an Al alloy layer may not be easily formed to cause a non-plating phenomenon, or grains of the Al alloy layer may not be uniform. In this case, alloying of the plating layer may be delayed in an initial stage of heating in a hot pressing process, and thus a sufficient degree of heat resistance for high-temperature heating may not be guaranteed. At this time, the thickness of the annealing oxide may be varied according to the contents of silicon (Si) and Mn in the base steel sheet, and when the thickness of the annealing oxide is 150 nm or less, platability and heat resistance may be secured while suppressing LME.

The thickness of the annealing oxide may be controlled to be 100 nm or less. For example, the thickness of the annealing oxide may be controlled to be 50 nm or less to maximize platability and heat resistance.

The annealing process may be performed in the temperature range of 700° C. to 900° C. so as to prevent formation of an annealing oxide, and thus to facilitate uniform alloying, guarantee heat resistance, and obtain a desired grain distribution in the Al-rich layer. If the process temperature of the annealing process is less than 700° C., material characteristics of steel may not be secured due to the low annealing temperature, and if the process temperature of the annealing process is greater than 900° C., a thin oxide film may not be formed between the steel sheet and the hot-dip zinc plating layer in the present disclosure because of a rapid growth rate of an oxide. If a hot-rolled steel sheet or a steel sheet subjected to a recrystallization heat treatment is used, the process temperature of the annealing process may be 500° C. to 700° C.

The dew point temperature of an annealing atmosphere may be −10° C. or lower. An atmosphere gas mixture may include 3 to 15 volume % of hydrogen ($H_2$) gas and the balance of nitrogen ($N_2$) gas. If the content of $H_2$ is less than 3%, the reducing power of the atmosphere gas decreases to facilitate the generation of oxides, and if the content of $H_2$ is greater than 15%, economical manufacturing costs increase too much although reducing power increases.

The base steel sheet is not limited to particular types of steel sheets such as hot-rolled steel sheets or cold-rolled steel sheets, as long as the base steel sheet is a steel sheet for hot press forming. Various steel sheets for hot press forming are known in the art to which the technical field of the present disclosure pertains, and the base steel sheet of the phase diagram is not limited thereto. However, when the base steel sheet is heated to an austenite region and quenched with water, oil, or cooled press dies, the tensile strength of the base steel sheet may be 1400 MPa or greater, more specifically, 1470 MPa or greater.

For example, in an embodiment of the present disclosure, the base steel sheet may include 0.1 wt % to 0.4 wt % of carbon (C), 2.0 wt % or less (excluding 0 wt %) of Si, 0.1 wt % to 4.0 wt % of Mn, and the balance of Fe and inevitable impurities. However, the base steel sheet is not limited thereto.

Hereinafter, the composition of the base steel sheet will be described according to an embodiment of the present disclosure. The contents of ingredients are given in wt % unless otherwise mentioned.

C: 0.1% to 0.4%

C is a key element for increasing strength of a steel sheet and generates hard phases of austenite and martensite. When a content of C is less than 0.1%, target strength may be difficult to obtain, even in the case that hot pressing is performed in an austenite single-phase region. Therefore, the content of C may be regulated to be 0.1% or more. If the content of C is more than 0.4%, toughness and weldability may decrease and strength may excessively increase, and thus, there may be limitations in manufacturing processes, such as obstruction of mass flow in annealing and plating processes. Therefore, an upper limit of the content of C is limited to 0.4% or less.

Mn: 0.1% to 4.0%

Mn is an element for solid-solution strengthening, which not only greatly contributes to a strength increase, but also plays an important role in delaying microstructure transformation from austenite to ferrite. If the content of Mn is less than 0.1%, an austenite-to-ferrite transformation temperature (Ae3) increases, and thus, a heat treatment temperature is increased to such an extent that a press forming process may be performed on a steel sheet in an austenite single phase. On the other hand, if the content of Mn is greater than 4.0%, weldability and hot rolling properties may deteriorate. At this time, for example, Mn may be included in an amount of 0.5% or more in order to decrease the ferrite transformation temperature (Ae3) and sufficiently secure hardenability.

Si: 2% or less (excluding 0 wt %)

Si is an element added for the purpose of deoxidization. If the content of Si is greater than 2%, a non-pickled hot-rolled steel sheet due to difficulties in pickling of the hot-rolled sheet and surface scale defects due to oxides not removed by picking may not only be generated, but bare spots may also be generated due to the generation of an $SiO_2$ oxide on a steel surface during annealing. Therefore, an upper limit of Si may be limited to be 2%. For example, the content of Si may be greater than 0.3% to maximize deoxidization.

Furthermore, in the present disclosure, inevitable impurities may be included in the base steel sheet. However, such inevitable impurities are known to those of skill in the art to which the technical field of the present disclosure pertains, and thus descriptions thereof will not be specifically given. An example of such inevitable impurities is Al. If the content of Al is high, cracks may be present in the base steel sheet in a steel making process. Therefore, the content Al is regulated to be as low as possible. For example, in embodiments of the present disclosure, the content of Al may be regulated to be 0.05% or lower. In addition, the inevitable impurities may include P.S, and the inevitable impurities may include other impurities known in the steel industry.

In addition, the base steel sheet may further include nitrogen (N): 0.001% to 0.02%, boron (B): 0.0001% to 0.01%, titanium (Ti): 0.001% to 0.1%, niobium (Nb): 0.001% to 0.1%, vanadium (V): 0.001% to 0.1%, chromium (Cr): 0.001% to 1.0%, molybdenum (Mo): 0.001% to 1.0%, antimony (Sb): 0.001% to 0.1%, and tungsten (W); 0.001% to 0.3%.

N: 0.001% to 0.02%

Since manufacturing costs for controlling N in a steel making process may greatly increase when the content of N is less than 0.001%, a lower limit thereof is determined as 0.001%. If the content of N is greater than 0.02%, manufacturing costs may increase because melting and continuous casting processes for steel sheets are difficult in terms of a manufacturing process, and cracks in a slab due to AlN may be facilitated. Therefore, an upper limit thereof is determined as 0.02%.

B: 0.0001% to 0.01%

Boron (B) is an element delaying an austenite-to-ferrite transformation. When the content of B is less than 0.0001%, an effect therefrom may be insufficiently obtained, and when the content of B is greater than 0.01%, an effect therefrom is saturated as well as hot workability being decreased. Therefore, an upper limit thereof may be limited to 0.01%.

Ti, Nb, or V: 0.001% to 0.1%

Ti, Nb, and V are effective elements for increasing strength of a steel sheet, refining grain size, and improving heat treatability. If the content of Ti, Nb, or V is less than 0.001%, effects therefrom may not sufficiently obtained, and if the content thereof is greater than 0.1%, desired effects of increasing strength and yield strength may not be expected due to increases in manufacturing costs and the generation of excessive carbonitride. Therefore, the upper limit thereof may be limited to 0.1%.

Cr or Mo: 0.001% to 1.0%

Since Cr and Mo not only increase hardenability but also increase toughness of a heat-treatable steel sheet, effects therefrom may be greater when added to a steel sheet requiring high impact energy. If the content of Cr or Mo is less than 0.001%, effects therefrom may not be sufficiently obtained, and if the content of Cr or Mo is greater than 1.0%, its effects are not only saturated but manufacturing costs may also increase. Therefore, the upper limit thereof may be limited to 1.0%.

Sb: 0.001% to 0.1%

Sb is an element for preventing selective oxidation of grain boundaries during hot rolling to generate uniform scaling and improve hot-rolled steel pickling properties. If the content of Sb is less than 0.001%, effects therefrom may not be obtained, and if the content of Sb is greater than 0.1%, effects therefrom is not only saturated but also manufacturing costs may increase and embrittlement may occur during hot working. Therefore, the upper limit thereof may be limited to 0.1%.

W: 0.001 t % to 0.3%

W is an element for improving heat treatment hardenability of a steel sheet and at the same time, for advantageously acting to secure strength due to W-containing precipitates. If the content of W is less than 0.001%, effects therefrom may not be sufficiently obtained, and if the content of W is greater than 0.3%, effects therefrom is not only saturated but manufacturing costs may also increase. Therefore, the content thereof may be limited to a range of 0.001% to 0.3%.

MODE FOR INVENTION

Hereinafter, the embodiments of the present disclosure will be described more specifically according to examples. However, the following examples should be considered in a descriptive sense only and not for purpose of limitation. The scope and spirit of the present disclosure are defined by the following claims and modifications and variations reasonably made therefrom.

EXAMPLES

First, experiments were conducted on steel sheets obtained by cold rolling steels having compositions listed in Table 1.

TABLE 1

| Category (wt %) | C | Si | Mn | P | S | Al |
|---|---|---|---|---|---|---|
| Steel 1 | 0.23 | 0.035 | 2.2 | 0.008 | 0.0015 | 0.035 |
| Steel 2 | 0.22 | 0.8 | 1.7 | 0.007 | 0.001 | 0.03 |

Before annealing, the steel sheets were coated with metals, releasing a smaller amount of Gibbs free energy than Cr per mole of oxygen during an oxidation reaction, to a thickness of 200 nm or less (in table 2, cells not filled with such metal names denote the case of not applying such a metal), and then were annealed at 785° C. and plated in a zinc plating bath containing 0.21 wt % of Al to form hot-dip plated steel sheets. At this time, although Fe dissolved from the (base) steel sheets might exist in the plating bath, the amount of Fe was not regulated as long as dross was not generated to such an extent to disrupt the process.

Samples were taken from the hot-dip zinc plated steel sheets, and the thicknesses of coating layers of the metals, the contents of the metals within a depth of 1 μm from the surfaces, and the thicknesses of zinc plating layers were measured from the samples by GOEDS analysis. In order to increase accuracy of data, the data points were compared and verified by SEM and transmission electron microscope (TEM) observations on cross sections of the samples, wet analysis, and electron spectroscopy for chemical analysis (ESCA). In addition, so as to observe grain size distributions of Al-rich layers existing between the base steel sheets and the zinc plating layers, portions of the plated steel sheets were taken and treated with an acid solution ($HNO_3 + CrO_3 + ZnSO_4$) to selectively remove the zinc plating layers, and then grain size distributions were observed using an image analyzer. Results of the observation are shown in Table 2. In table 2 below, corrosion test results are evaluated by the following references: "Excellent" denotes substantially no surface corrosion, "Good" denotes intermittent corrosion not deeper than 100 μm, and "Poor" denotes corrosion on the whole area or deeper than 100 μm. The contents of the applied metals were obtained by conversion from glow discharge spectroscopy (GDS) profiles.

In inventive Examples 1 to 4, the base steel sheets were coated with metals releasing a smaller amount of Gibbs free energy than Cr per mole of oxygen during an oxidation reaction to adjust the grain size distributions of Al-rich layers in accordance with the present disclosure. On the other hand, in Comparative Examples 1 to 3, no treatment was performed for adjusting the grain size distribution of Al-rich layers.

Figure 11:
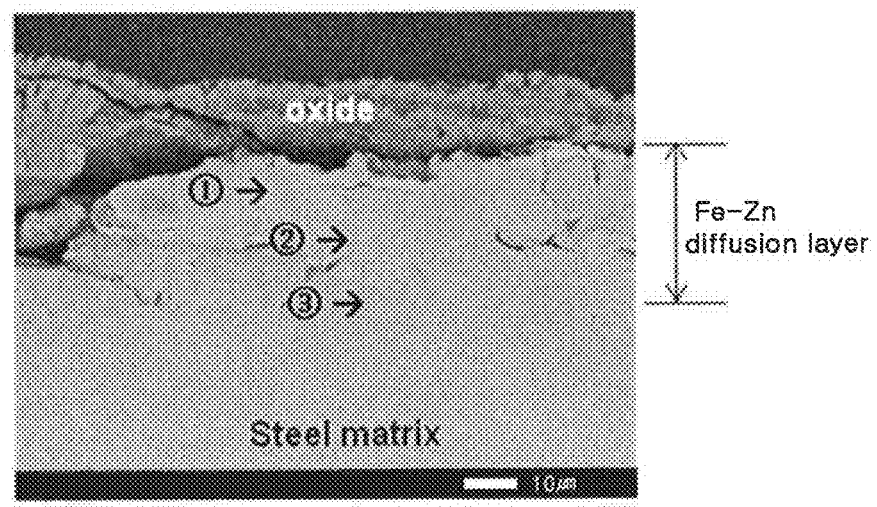
FIG. 11 shows EDS analysis results on a cross section and ingredients of a hot press formed part with respect to positions in Comparative Example 3.

In Inventive Examples 1 to 4, LME cracking did not occur during a hot pressing process, and the base steel sheets were almost not corroded after a 480-hr salt spray test (SST) using a 5% NaCl aqueous solution. However, in Comparative Examples 1 and 2, cracking occurred during a hot pressing process. In Comparative Example 3, the content of Zn in a plating layer was considerably reduced to result in a thick surface oxide layer as shown in FIG. 11, and due to very poor corrosion resistance, the surface of the base steel sheet was corroded up to a 300 μm or deeper after an SST.

After plating, the hot-dip zinc plated steel sheets were hot-pressed under the conditions shown in Table 2 using a hot press heating furnace controlled in an air atmosphere. After the hot pressing process, the surfaces of the plating layers thereof were observed using X-ray diffraction (XRD) and GOEDS analysis methods to analyze surface oxides, and alloy phases in the plating layers were analyzed. The thicknesses of the plating layers were measured vertically from the surfaces thereof to positions where the content of Zn was 25 wt % or greater.

Figure 4:
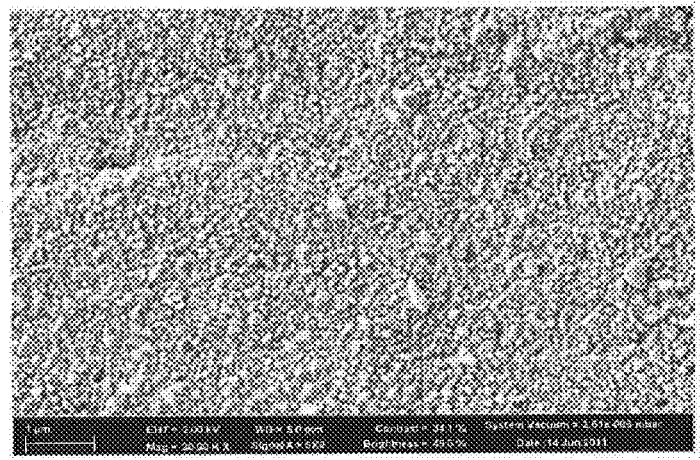
FIG. 4 is a scanning electron microscope image of an aluminum (Al)-rich layer existing between a zinc plating layer and a steel sheet in a hot-dip zinc plated steel sheet fabricated according to Inventive Example 2.
Figure 5:
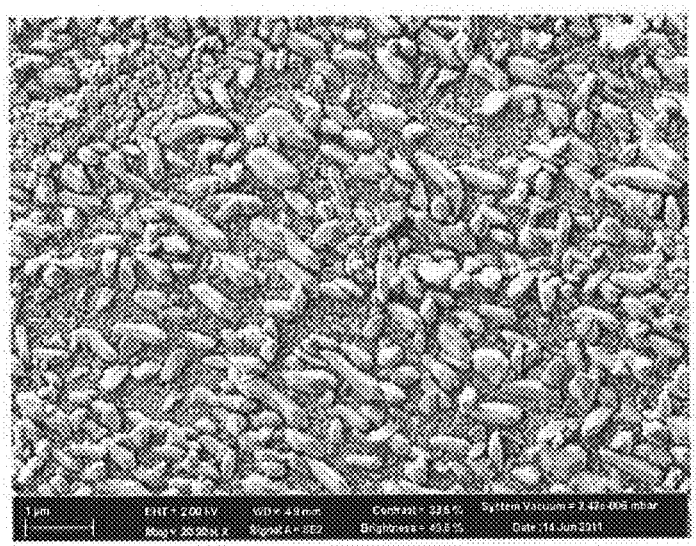
FIG. 5 is a scanning electron microscope image of an Al-rich layer existing between a zinc plating layer and a steel sheet in a hot-dip zinc plated steel sheet fabricated according to Inventive Example 1.

Referring to Table 2, in the cases where surface diffusion layers were formed of metals releasing a smaller amount of Gibbs free energy than Cr per mole of oxygen during an oxidation reaction, the grain size distributions of the Al-rich layers satisfied the conditions of the present disclosure. However, in the other cases, that is, in Comparative Examples, the grain size distributions of the Al-rich layers did not satisfied the conditions of the present disclosure. FIGS. 4 and 5 are electron microscope images of the Al-rich layers of Inventive Example 2 and Comparative Example 1, respectively. As shown in FIGS. 4 and 5, the grains of the Al-rich layer of Inventive Example 2 are fine and uniform, but the grains of the Al-rich layer of Comparative Example 1 are not uniform and include a lot of coarse grains having a diameter of 500 nm or greater.

The grain size distributions of the Al-rich layers had a large effect on hot-press formability. That is, as shown in Table 2, when the Al-rich layer had a large number of coarse grains, the base steel sheet was cracked due to LME during a hot pressing process.

TABLE 2

| EXAMPLES | STEELS | COATING METAL | Content of coating metal in diffusion layer (wt %) | Number of Ø500 nm or greater grains per 100 μm² in Al-rich layer | % of surface Al-rich layer | (t)*** of Zn plating layer (μm) | Heating Temp of hot pressing (° C.) | Heating time of hot pressing (min) | Surface cracking during heating in hot pressing (LME cracking) | Corrosion test results from processed samples (After 480-hr SST) |
|---|---|---|---|---|---|---|---|---|---|---|
| IE*1 | Steel 1 | Ni | 1.7 | 6.5 | 91.5 | 8 | 900 | 5 | None | Excellent |
| IE2 | Steel 1 | Ni | 3.0 | 5.1 | 94.3 | 8 | 910 | 5 | None | Excellent |
| IE3 | Steel 2 | Fe—Ni | 3.2 | 2.3 | 90.1 | 8 | 850 | 7 | None | Excellent |
| IE4 | Steel 1 | Cu | 3.5 | 3.5 | 90.5 | 10 | 930 | 5 | None | Excellent |
| CE**1 | Steel 1 | — | — | 16 | 87 | 10 | 900 | 5 | Cracking | Good |
| CE2 | Steel 2 | — | — | 21 | 75 | 10 | 880 | 5 | Cracking | Good |
| CE3 | Steel 2 | — | — | 18 | 81 | 7 | 910 | 5 | None | Poor |

*IE: Inventive Example,
**CE: Comparative Example,
***(t): thickness

Figure 6:
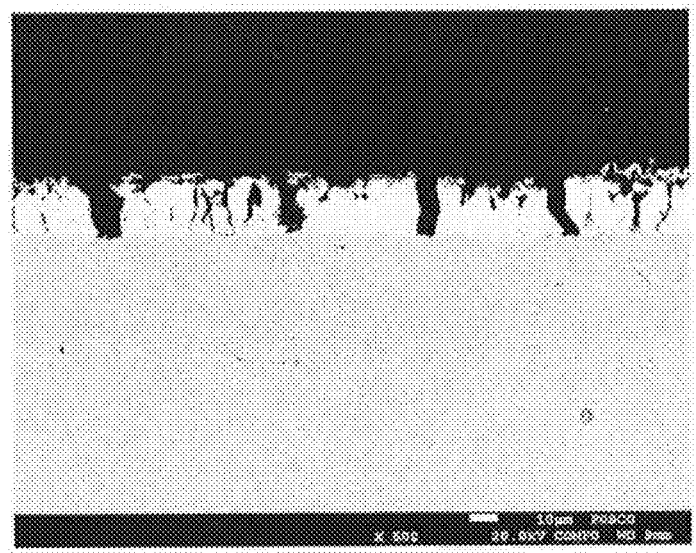
FIG. 6 is an electron microscope image of a surface of a hot press formed steel sheet (part) in Inventive Example 2.
Figure 7:
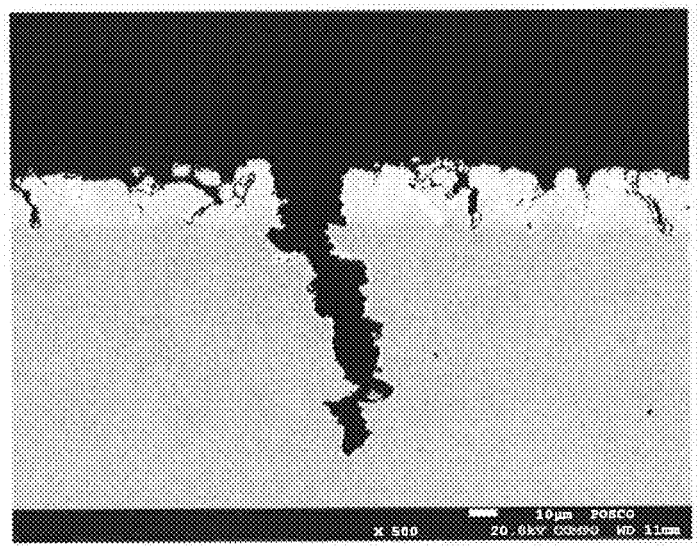
FIG. 7 is an electron microscope image of a surface of a hot press formed steel sheet (part) in Comparative Example 1.

In addition, to compare the phenomena more clearly, cross sections of the hot-pressed steel sheets (parts) of Inventive Example 2 and Comparative Example 1 were observed using an electron microscope, and the results are shown in FIGS. 6 and 7. FIGS. 6 and 7 show intensively hot-pressed portions. No Surface crack was observed in Inventive Example 2 shown in FIG. 6, but a crack caused by LME was developed into the base steel sheet in Comparative Example 1 shown in FIG. 7.

Figure 8:
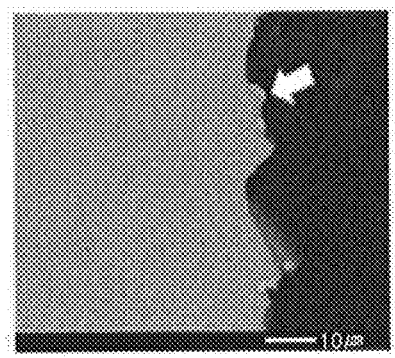
FIG. 8 is a transmission electron microscope image of a cross section of a hot press formed part in Comparative Example 1.
Figure 8:
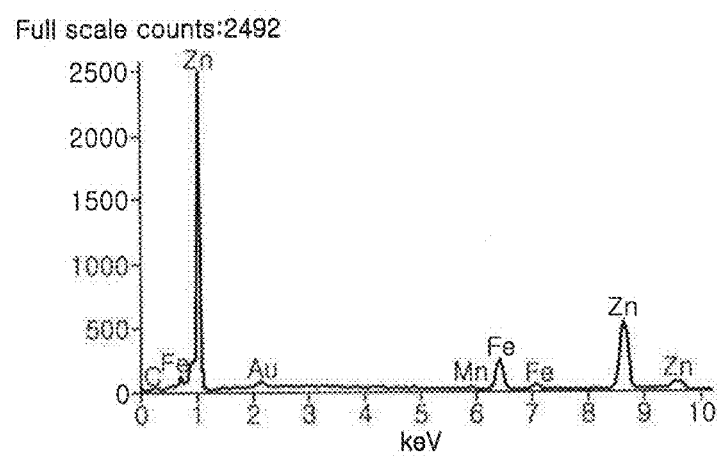

FIG. 8 shows Zn penetrated into the crack of the base steel sheet shown in FIG. 7. In detail, FIG. 8 shows the crack penetrated in to the base steel sheet at a large magnification and EDS analysis data on a Zn-rich layer formed in the crack. Zn penetrated between portions of the crack.

It is considered that during heating, uniform alloying did not occur, but an Fe-excessive alloy phase and a Zn liquid phase coexisted locally and the Zn liquid phase penetrated into the grain boundaries of the base steel sheet to cause embrittlement.

Table 3 below shows measurement results on LME and surface corrosion according to alloy phases in the plating layers during hot forming.

According to actual measurement results, a phase in which 35 wt % to 90 wt % of Zn was included was little observed, but a phase in which 25 wt % to 35 wt % of Zn was included was substantially 99% or greater. The Zn content values shown in Table 2 are average values obtained by measuring five regularly arranged positions from top to bottom of a cross section of a plating layer by an EDS method, averaging the measured values.

As described above, if a region in which 35 wt % to 90 wt % of Zn is included is 5 vol % or less of a plating layer, more specifically, 1 vol % or less of a plating layer, LME may be suppressed during a hot pressing process. That is, hot press forming and use of parts are significantly affected by such a region. In other words, as shown in Table 3, if 95 volt of a plating layer has a Zn content of 25 wt % to 35 wt % at a heating temperature range of 780° C. to 950° C., during a hot pressing forming process, an LME phenomenon may be suppressed to prevent cracking of a steel sheet.

In the inventive examples, Zn was stably distributed in the plating layer within the content range of 25 wt % to 35 wt %,

TABLE 3

| EXAMPLES | Content of coating metal in diffusion layer (wt %) | Zn Plating Layer (t)* (µm) | Heating time to 900° C. (min) | 900° C., Content of Zn in plating layer (wt %) | Vol % of phase having 25-35% of Zn in Plating layer (%) | Whether Zn 35-90% region accounts for 5% or more of plating layer | Heating Temp of hot pressing (° C.) | Surface cracking during heating in hot pressing (LME cracking) | Corrosion test results from processed samples (After 480-hr SST) |
|---|---|---|---|---|---|---|---|---|---|
| IE1* | 1.7 | 8 | 5 | 30.3 | >99 | No | 900 | None | Excellent |
| IE2 | 3.0 | 8 | 5 | 34.1 | >99 | No | 910 | None | Excellent |
| IE3 | 3.2 | 8 | 7 | 32.2 | >99 | No | 850 | None | Excellent |
| IE4 | 3.5 | 10 | 5 | 33.3 | >99 | No | 930 | None | Excellent |
| CE1** | — | 10 | 5 | 37.2 | 72 | Yes | 900 | None | Good |
| CE3 | — | 7 | 5 | 14.5 | — | No | 910 | None | Poor |

*IE: Inventive Example,
**CE: Comparative Example,
***(t): thickness

The steel sheets were heated and rapidly cooled under the conditions shown in Table 3, and the content and phase of Zn in the zinc plating layers were analyzed. The heating was performed at an average rate of 4° C./sec. As shown in the drawings, the steel sheets of the inventive examples of the present disclosure had about 25 wt % to 35 wt % of Zn at 900° C., but the steel sheets of the comparative examples had large amounts of phases having a high Zn content. Although not shown in Table 3, the steel sheets were taken out at 750° C. and rapidly cooled to analyze the plating layers thereof. According to the results of the analysis, Fe-rich and Zn-rich regions coexisted in the case of the inventive examples.

To confirm that the conditions given in Table 3 lead to the LME phenomenon during an actual hot press forming process, the hot-dip zinc plated steel sheets were hot-pressed under the conditions of Table 3. At that time, a hot press heating furnace was controlled under an air atmosphere. The average heating rate in the hot pressing process was 4° C./sec, and the retention time period in the heating furnace was 5 minutes. After the hot pressing process, the surfaces of the plating layers were observed using XRD and GOEDS analysis methods to analyze surface oxides, and alloy phases in the plating layers were analyzed. The thicknesses of the plating layers were measured vertically from the surfaces thereof to positions where the content of Zn was 25 wt % or greater.

According to the results of EDS analysis on cross sections of the plating layers after the hot pressing process, a Zn-rich region in which 35 wt % to 90 wt % of Zn was included was 5% or less of the plating layer in Inventive Examples 1 to 4.

and thus the base steel sheet was little corroded after a 480-hr SST using a 5% NaCl aqueous solution. That is, corrosion resistance was good in the inventive examples.

As shown in FIG. 10, in Comparative Example 1, a thick surface oxide layer was observed due to a low Zn content, and due to a very low degree of corrosion resistance, the surface of the steel sheet is corroded up to a depth of 300 µm or more after an SST.

Figure 9:
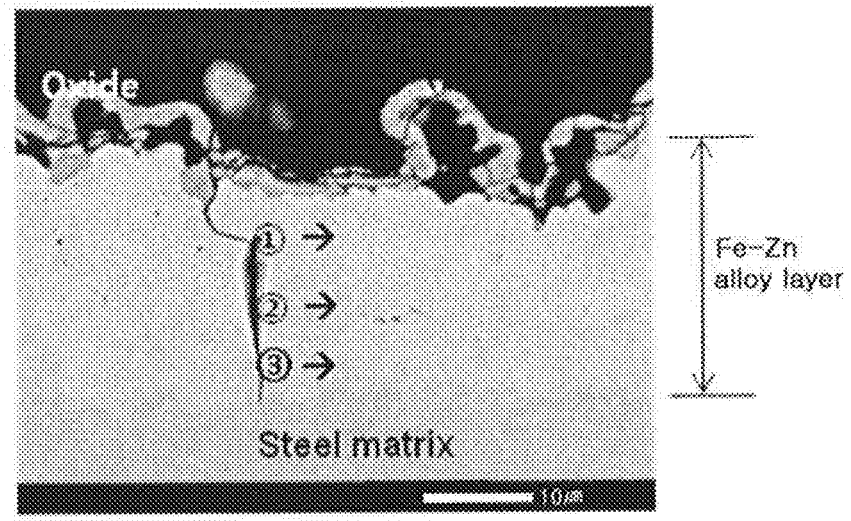
FIG. 9 shows energy dispersion electroscope (EDS) analysis results on a cross section and ingredients of a hot press formed part with respect to positions in Inventive Example 1.

In addition, to provide a clear comparison between the inventive examples and the comparative examples based on the test results shown in Tables 2 and 3, a cross section of a hot press formed part fabricated according to Example 1, and ingredients of positions of the hot press formed part were analyzed using an EDS. Results thereof are shown in FIG. 9 and Table 4. Cross sections of hot press formed parts fabricated according to Comparative Examples 1 and 3, and ingredients of positions of the hot press formed parts were analyzed using an EDS, and results thereof are shown in FIGS. 10 and 11 and Tables 5 and 6, respectively. In the analysis, it may be unclear as to whether ingredients having a content of 0.5 wt % or lower are actually existing ingredients due to the characteristics of EDS analysis.

In the inventive example shown in FIG. 9 and Table 4, a stable plating layer having an Fe content of 25 wt % to 35 wt % was formed after a hot pressing process, and the plating layer was clearly distinguished from a base steel sheet. In addition, an oxide layer having a thickness of 5 µm or less was uniformly formed on the plating layer. Zn contents measured from positions of the plating layer clearly distinguished from the base steel sheet were in the range of 25 wt % to 35 wt %. Hot-pressed portions were not cracked, and the base steel sheet was little corroded owing to good corrosion resistance. In the plating layer shown in FIG. 9, alloying of Fe during a hot pressing process follows that shown in FIG. 1.

On the other hand, in Comparative Example 1 shown in FIG. 10 and Table 5, after a hot pressing process, a Zn-rich region (indicated by arrow ②) in which the content of Zn was greater than 40% was present in a plating layer. The Zn-rich region may cause LME in a machining process. Particularly, an Fe-rich region having a Zn content of 25% to 35% and a Zn-rich region having a Zn content of 35% to 90% was observed in a mixed state. Due to the Zn-rich region, a liquid phase region may be generated during heating to 780° C. to 950° C., to cause cracking in a hot pressing process. In addition, a surface oxide layer was not uniform.

Figure 2:
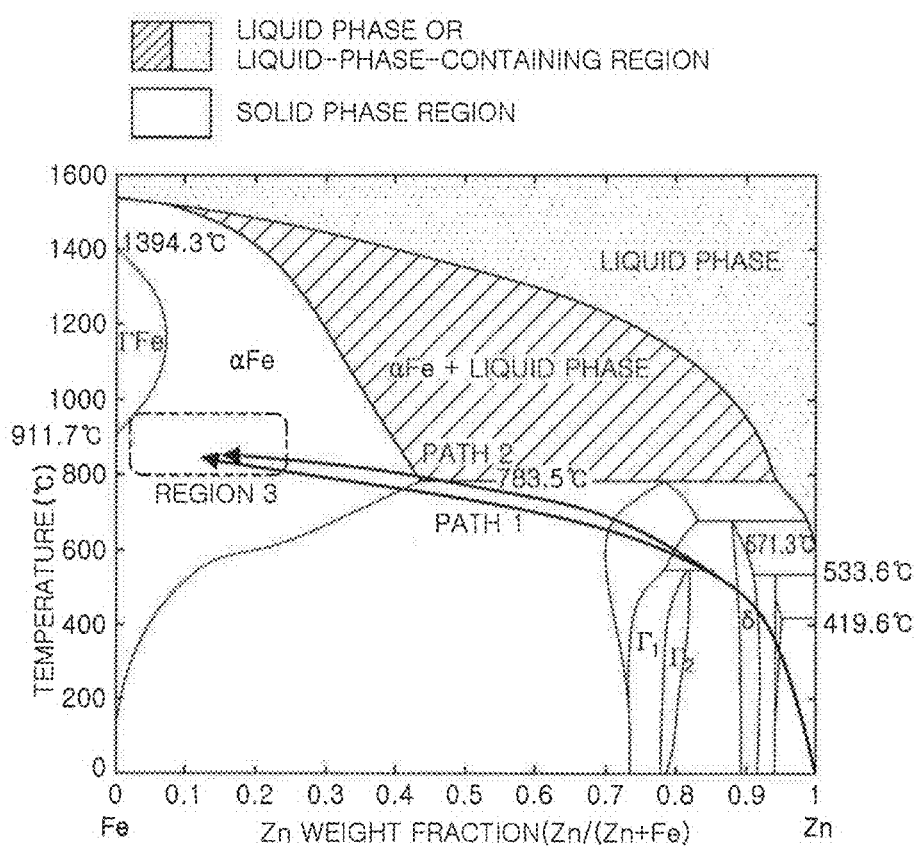
FIG. 2 is a phase diagram showing heating paths along which the content of Zn is excessively reduced during heat press forming.

In Comparative Example 3 shown in FIG. 11 and Table 6, a surface oxide layer having a thickness greater than 5 μm was formed, and the interface between a plating layer and a base steel sheet was unclear. In addition, the content of Zn in the plating layer was too low at about 20 wt % or less to guarantee corrosion resistance. Eventually, most of the zinc plating layer diffused into the base steel sheet and disappeared. In this case, as shown in Table 3, sufficient corrosion resistance is not guaranteed when the hot press formed part is used. In the plating layer shown in FIG. 11, alloying of Fe during a hot pressing process follows that shown in FIG. 2.

TABLE 4

| Ingredients (wt %) | ① | ② | ③ |
|---|---|---|---|
| Mn | — | — | — |
| Si | — | — | — |
| Fe | 68.6 | 69.8 | 73.4 |
| Zn | 31.4 | 30.2 | 26.6 |

TABLE 5

(Comparative Example 1)

| Ingredients (wt %) | ① | ② | ③ |
|---|---|---|---|
| Mn | — | — | 1.2 |
| Si | — | — | — |
| Fe | 67.9 | 27.4 | 67.7 |
| Zn | 32.1 | 72.6 | 31.1 |

TABLE 6

(Comparative Example 3)

| Ingredients (wt %) | ① | ② | ③ |
|---|---|---|---|
| Mn | — | — | 1.8 |
| Si | — | — | — |
| Fe | 81.5 | 84.4 | 96.1 |
| Zn | 18.5 | 15.6 | 2.1 |

Figure 12:
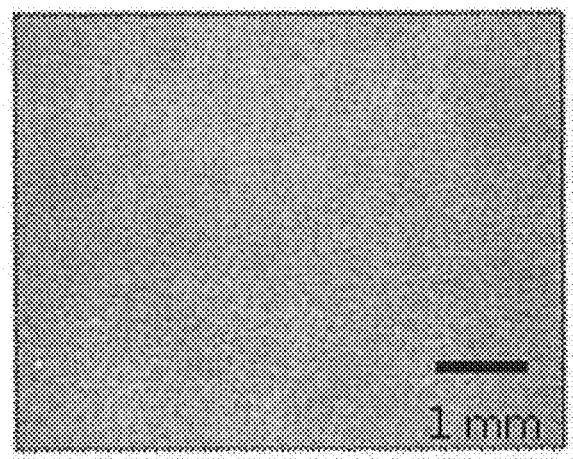
FIG. 12 is a surface image of a hot-pressed portion in Inventive Example 1.

FIG. 12 illustrates an image of a hot-pressed surface in Inventive Example 1 shown in Table 3. Surface cracking is not present.

Figure 13:
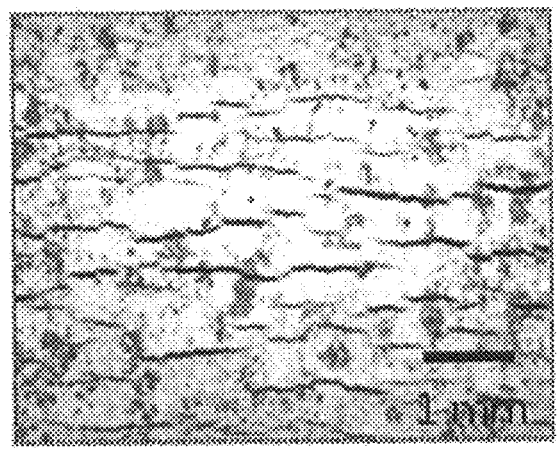
FIG. 13 is a surface image of a hot-pressed portion in Comparative Example 3.

FIG. 13 is a surface image of a hot-pressed portion in Comparative Example 3. Surface cracking caused by LME is present.

The invention claimed is:

1. A plated steel sheet for hot press forming, comprising:
   a base steel sheet;
   an aluminum (Al)-rich layer formed above the base steel sheet and comprising 30% or more of Al; and
   a zinc plating layer formed on the Al-rich layer,
   wherein grains of the Al-rich layer comprise fifteen or fewer grains having a grain size of 500 nm or greater per 100 μm$^2$ on average, and an area percentage of the Al-rich layer between the base steel sheet and the zinc plating layer is 88% or greater; and
   wherein the base steel sheet comprises a surface diffusion layer of a metal to a depth of 1 μm or less from a surface thereof, the metal releasing a smaller amount of Gibbs free energy than chromium (Cr) per mole of oxygen during an oxidation reaction.

2. The plated steel sheet for hot press forming of claim 1, wherein the Al-rich layer has a thickness of 0.1 μm to 1.0 μm.

3. The plated steel sheet for hot press forming of claim 1, wherein the area percentage of the Al-rich layer between the base steel sheet and the zinc plating layer is 95% or greater.

4. The plated steel sheet for hot press forming of claim 1, wherein if the plated steel sheet is heated to 900° C., 90 vol % or more of the zinc plating layer comprises 25 wt % to 35 wt % of zinc (Zn).

5. The plated steel sheet for hot press forming of claim 4, wherein at a temperature of 750° C., the zinc plating layer comprises an iron (Fe)-rich region having a Zn content of 40 wt % or less and a Zn-rich region having a Zn content of greater than 40 wt %.

6. The plated steel sheet for hot press forming of claim 5, wherein at a temperature of 750° C., the zinc plating layer comprises an Fe-rich region having a Zn content of 30 wt % to 40 wt % and a Zn-rich region having a Zn content of 60 wt % to 90 wt %.

7. The plated steel sheet for hot press forming of claim 1, wherein the metal, releasing a smaller amount of Gibbs free energy than Cr per mole of oxygen during an oxidation reaction, comprises at least one selected from nickel (Ni), Fe, cobalt (Co), copper (Cu), tin (Sn), and antimony (Sb).

8. The plated steel sheet for hot press forming of claim 1, wherein the zinc plating layer comprises 15 wt % or less of Fe.

9. The plated steel sheet for hot press forming of claim 1, wherein the zinc plating layer comprises, Fe: 15.0% or less, the metal releasing a smaller amount of Gibbs free energy than Cr per mole of oxygen during an oxidation reaction: 0.01 wt % to 2.0 wt %, the balance of Zn and inevitable impurities.

10. The plated steel sheet for hot press forming of claim 1, wherein an annealing oxide formed on the base steel sheet has a thickness of 150 nm or less.

11. The plated steel sheet for hot press forming of claim 1, wherein the base steel sheet comprises, by wt %, carbon (C): 0.1% to 0.4%, silicon (Si): 2.0% or less (excluding 0%), manganese (Mn): 0.1% to 4.0%, and the balance of Fe and inevitable impurities.

12. The plated steel sheet for hot press forming of claim 11, wherein the base steel sheet further comprises at least one selected from the group consisting of nitrogen (N): 0.001% to 0.02%, boron (B): 0.0001% to 0.01%, titanium (Ti): 0.001% to 0.1%, niobium (Nb): 0.001% to 0.1%, vanadium (V): 0.001% to 0.1%, Cr: 0.001% to 1.0%, molybdenum (Mo): 0.001% to 1.0%, Sb: 0.001% to 0.1%, and tungsten (W): 0.001% to 0.3%.

13. The plated steel sheet for hot press forming of claim 1, wherein the metal is nickel (Ni).

* * * * *